May 10, 1949. J. BERGMANS ET AL 2,470,012
RADIO RECEIVER TUNING INDICATOR INCLUDING
A WIDE ANGLE VIEWING LENS
Filed April 23, 1946
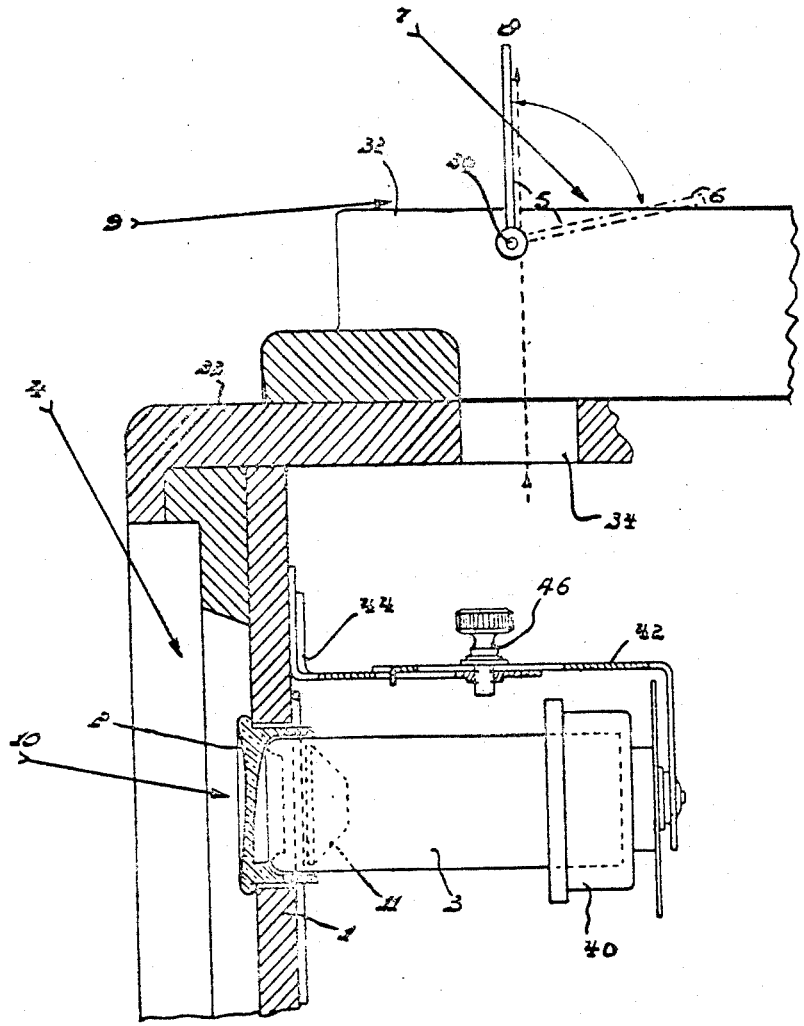
JAN BERGMANS
JOHAN GEORGE KRONOUER
& MAX LEEUWIN
INVENTORS
BY E. J. Wendroth
ATTORNEY

UNITED STATES PATENT OFFICE 2,470,012

RADIO RECEIVER TUNING INDICATOR, IN-
CLUDING A WIDE ANGLE VIEWING LENS

Jan Bergmans, Johan George Kronouer, and Max
Leeuwin, Eindhoven, Netherlands, assignors, by
mesne assignments, to Hartford National Bank
and Trust Company, Hartford, Conn., as trustee Application April 23, 1946, Serial No. 664,398
In the Netherlands September 4, 1941

Section 1, Public Law 690, August 8, 1946
Patent expires September 4, 1961

5 Claims. (Cl. 88—1)

The invention relates to means whereby an observer may view an indicator and a dial simultaneously from different directions.

With such devices as radio receiving apparatus or measuring devices there is frequently encountered the disadvantage that the solid angle within which the indicating member can be observed is comparatively small, or at least insufficient to permit the observer to view simultaneously an indicator and a tuning dial from a position which he may choose arbitrarily.

The invention has for its object to extend the solid angle within which the indicator and the dial may be viewed simultaneously and thus to increase the freedom of construction of the two above-described elements of the device without giving up the possibility of their simultaneous reading.

For this purpose a diverging lens, preferably made of polystyrene, is placed in front of the indicating member, with the result that a reduced image of the indicating member can be observed through a considerably increased solid angle. The reduction involves in this case no appreciable drawback, since the observation is not scale-reading but relates to a maximum or minimum dimension of a shade or fluorescent sector and when applied to scale-reading the lens is used only to afford a rough image from a wide solid angle whilst a more exact reading may take place directly.

It is frequently desired to be able to observe the two elements simultaneously especially from a determined direction which is eccentric relatively to the optical axis of the lens. It is advisable in this case to provide the diverging lens with a prismatic component, owing to which the solid angle within which the indicating member is visible is extended in a determined preferred direction.

A special application of the invention is possible in the case of a radio-receiving apparatus provided with a dial which is pivoted on a horizontal shaft, so that the normal to the face of the dial on which line an observer would normally desire to sight assumes different angles in a vertical plane. It is advisable in this case to mount the tuning indicator, for example a fluorescent tube, a neon tube or a shade indicator, rigidly in the front wall of the cabinet of the apparatus behind the diverging lens and to mount the tuning dial on the outside on the said cabinet, the construction being such that the tuning indicator can be observed with the scale in upright position and with horizontal direction of observation as well as with the scale in backwardly inclined position and with a direction of observation which is directed vertically from above.

It is advantageous to insert the diverging lens in the last-mentioned case by a substantially cylindrical projection which extends axially from the lens periphery and which fits snugly into a hole provided in the front wall of the cabinet whilst the face of the indicator tube fits into the cavity formed by the lens and the cylindrical projection.

The invention will be explained more fully with reference to one embodiment thereof which is shown by way of example, in the accompanying drawing.

The drawing shows a cross-sectional view of part of the cabinet of a radio-receiving apparatus in which a divergent lens according to the invention is arranged.

In the front wall 1 of the cabinet is provided a diverging lens 2 with a prismatic component, as shown, owing to which the solid angle of observation of the indicator tube 3 is extended, especially in an upward direction, to such an extent that it is possible to observe the indicator screen 11 from the direction of an arrow 4 from a high point outside the drawing from which a pivoted dial 5, diagrammatically shown in two positions, can be read in position 6 according to the arrow 7. Thus, the position 8 of the dial corresponds to a position of the observer at a point where arrows 9 and 10 extended back intersect at about the same level as the top of the cabinet some distance to the left and outside of the drawing, and position 6 of the dial corresponds to a position of the observer at a point located much higher and to the left of the drawing where arrows 4 and 7 extended back intersect.

The dial 5 may be pivoted on a shaft 30 journaled at its ends in shoulders of the cabinet, one of which 32 is shown. The pointer (not shown) of dial 5 moves perpendicularly to the plane of the drawing, regardless of the position of the dial. Tube 3 is held by a socket 40 supported by a bracket 42 which is removably attached to a bracket 44 by a screw 46. Bracket 44 is attached to wall 1 of the cabinet.

Owing to the above-described construction it is possible to choose a very light construction for the scale, which may be constituted in this case by little more than a glass plate which may be provided in the known manner with an illuminating device (not shown) in the plane of the plate at one side thereof. Such an all-glass construction greatly embellishes the outer appearance of the receiving set whilst the construction according to the invention makes it possible to observe the indicator rigidly mounted in the cabinet of the apparatus, from any position from which the observer may choose to read the dial.

We claim:

1. A radio-receiving apparatus comprising a cabinet, a tuning dial mounted on top of said cabinet and pivoted on a horizontal axis extending from left to right of said cabinet so as to be adjustable to an inclined position, said apparatus further comprising a tuning indicator which is rigidly mounted in the front wall of said cabinet, means for displacing the angle at which said indicator may be viewed to a value to permit viewing thereof from a position in front of said cabinet at which said tuning dial in the different inclined positions thereof is normally viewed, said means comprising a prismatic optical body mounted in front of said indicator, whereby an operator of said radio receiving apparatus may simultaneously view said tuning indicator and said tuning dial even when said dial is in inclined position.

2. A radio-receiving apparatus comprising a cabinet, a tuning dial mounted on top of said cabinet and pivoted on a horizontal axis extending from left to right of said cabinet so as to be adjustable to an inclined position, said apparatus further comprising a tuning indicator tube which is rigidly mounted with an end thereof protruding into the front wall of said cabinet, means for displacing the angle at which the interior of said indicator tube may be viewed to a value to permit viewing thereof from a position in front of said cabinet at which said tuning dial in the different inclined positions thereof is normally viewed, said means comprising a divergent lens having an axis and mounted in front of said end of said indicator tube in coaxial alignment therewith, whereby an operator of said radio-receiving apparatus may simultaneously view said tuning indicator tube and said tuning dial even when said dial is in inclined position.

3. A radio-receiving apparatus comprising a cabinet, a tuning dial mounted on top of said cabinet and pivoted on a horizontal axis extending from left to right of said cabinet so as to be adjustable to an inclined position, said apparatus further comprising a tuning indicator tube which is rigidly mounted with an end thereof protruding into the front wall of said cabinet, means for displacing the angle at which interior of said indicator tube may be viewed to a value to permit viewing thereof from a position in front of said cabinet at which said tuning dial in the different inclined positions thereof is normally viewed, said means comprising a divergent lens having an axis and mounted in front of said end of said indicator tube in coaxial alignment therewith, said lens having a prismatic body portion therein, whereby an operator of said radio-receiving apparatus may simultaneously view said tuning indicator tube and said tuning dial even when said dial is in inclined position.

4. A radio-receiving apparatus comprising a cabinet, a tuning dial mounted on top of said cabinet and pivoted on a horizontal axis extending from left to right of said cabinet so as to be adjustable to an inclined position, said apparatus further comprising an opening in the front wall of said cabinet, a tuning indicator screen mounted inside said cabinet in horizontal alignment with said opening, means for displacing the angle at which said indicator screen may be viewed from outside said cabinet to a value to permit viewing thereof from a position in front of said cabinet at which said tuning dial in the different inclined positions thereof is normally viewed, said means comprising a prismatic optical body mounted in front of said indicator screen, whereby an operator of said radio-receiving apparatus may simultaneously view said tuning indicator screen and said tuning dial even when said dial is in inclined position.

5. A radio-receiving apparatus comprising a cabinet, a tuning dial mounted on top of said cabinet and pivoted on a horizontal axis extending from left to right of said cabinet so as to be adjustable to an inclined position, said apparatus further comprising an opening in the front wall of said cabinet, a tuning indicator tube mounted inside said cabinet in horizontal alignment with said opening, a tuning indicator screen mounted in said tube, means for displacing the angle at which said indicator screen may be viewed from outside said cabinet to a value to permit viewing thereof from a position in front of said cabinet at which said tuning dial in the different inclined positions thereof is normally viewed, said means comprising a divergent lens with a prismatic component and having a tubular projection extending from the periphery thereof, said projection being received by and secured within said opening and forming with said lens a cup-shaped cavity presented toward said tuning indicator tube, said tube having the front end thereof received in said cavity, whereby an operator of said radio-receiving apparatus may simultaneously view said tuning indicator and said tuning dial even when said dial is in inclined position.

JAN BERGMANS.
JOHAN GEORGE KRONOUER.
MAX LEEUWIN.

REFERENCES CITED

The following references are of record in the file of this patent:

UNITED STATES PATENTS

| Number | Name | Date |
| --- | --- | --- |
| 736,751 | Lobmiller | Aug. 18, 1903 |
| 1,087,466 | Sargent | Feb. 17, 1914 |
| 1,346,138 | Smalley | July 13, 1920 |
| 1,731,284 | Andel et al. | Oct. 15, 1929 |
| 1,955,085 | Osborn | Apr. 17, 1934 |
| 2,079,752 | Toth et al. | May 11, 1937 |
| 2,240,931 | Hurd | May 6, 1941 |
| 2,262,203 | Redstone et al. | Nov. 11, 1941 |
| 2,273,259 | Gosling | Feb. 17, 1942 |